United States Patent [19]

Pike

[11] Patent Number: 5,311,286
[45] Date of Patent: May 10, 1994

[54] APPARATUS AND METHOD FOR OPTICALLY MEASURING A SURFACE

[75] Inventor: John N. Pike, Pleasantville, N.Y.

[73] Assignee: Materials Technologies Corporation, Monroe, Conn.

[21] Appl. No.: 861,605

[22] Filed: Apr. 1, 1992

[51] Int. Cl.$^5$ ............................................ G01B 11/30
[52] U.S. Cl. .................................... 356/371; 356/445; 250/237 G
[58] Field of Search ............... 356/371, 374, 376, 377, 356/445, 237; 250/237 G

[56] References Cited

U.S. PATENT DOCUMENTS

| | | | |
|---|---|---|---|
| 3,627,427 | 12/1971 | Johnson | 356/376 |
| 3,943,278 | 3/1976 | Ramsey, Jr. | 356/376 |
| 4,145,140 | 3/1979 | Fujii | 356/371 |
| 4,794,550 | 12/1988 | Greivenkamp, Jr. | 356/376 |
| 4,981,360 | 1/1991 | Schwarz | 356/376 |

FOREIGN PATENT DOCUMENTS

| | | | |
|---|---|---|---|
| 0206908 | 12/1983 | Japan | 356/371 |
| 0243841 | 10/1988 | Japan | 356/371 |

OTHER PUBLICATIONS

Optical Engineering, "Photogrammetric applications of Moire fringes produced with a parallel beam of light", vol. 18, No. 4, Jul.-Aug. 1979, pp. 399-402 Terada et al.
Optical Technology, "Extension of the Optical Profile Technique to Inspection of Surface Profile", vol. 38, No. 12, pp. 761-762, 12-1971, A. I. Inyushin.
SPIE Technical Symposium, "Two High-Speed Dimensional Measuring Systems" vol. 5, Aug. 1966, Till K. Dehmel.
Mezel, E., Die Naturwissen-schaften, "Mehrfacher mikroskopischer Lichtschnitt", pp. 332-333 (May 1951).
Wolter, H. "Schlieren—, Phasenkonstrast— und Lichtschnittverfahren", in Handbuch der Physik, S. Flugge, ed., (Springer, 1956), vol. 24, pp. 633-636.
Gasvik, K. J., "Optical Metrology", John Wiley & Sons, pp. 117-124-127 (1987).
Kafri, O., and Glatt, I., "The Physics of Moire Metrology", John Wiley & Sons, pp. 53-55, 60-67, 72-75, 112, 160-163 (1990).
Cielo, P., "Optical Techniques for Industrial Inspection", Academic Press, pp. 185-211, 300-305 (1988).
Dufour, M., and Cielo, P., "Optical Inspection for Adaptive Wedding", Applied Optics, vol. 23, No. 8, pp. 1132-34 (Apr. 15, 1984).
Jalkio, J. A. et al., "Three dimensional inspection using multistripe structured light", Optical Engineering, vol. 24, No. 6, pp. 966-974 (Nov./Dec. 1985).
Meadows, D. M. Johnson, W. O., and Allen, J. B., Applied Optics, "Generation of Surface Contours by Moire Patterns", vol. 4, No. 4, 942-947 (Apr. 1970).
Takasaki, H., Applied Optics, "Moire Topography", vol. 9, No. 6, pp. 1457, 1468-72 (Jun. 1970).
Koelsch, A. C., Electro-Optical Systems Design, "A Moire Theory Primer", pp. 46-47 (Jun. 1976).
Gate, L., Windle, W. and Hine, M., TAPPI, "The Relationship between Gloss and Surface Microtexture of Coatings", vol. 56, No. 3, pp. 61-65 (Mar. 1973).
Erf, R. K., Speckle Metrology, Ch. 3, pp. 11-15, 46-49, "Surface Roughness Measurement", Academic Press (1978).

Primary Examiner—Richard A. Rosenberger
Assistant Examiner—Hoa Q. Pham
Attorney, Agent, or Firm—McCormick, Paulding & Huber

[57] ABSTRACT

An apparatus and method measures the roughness or some other surface dimension by transmitting a beam of light through a grating member at an angle of incidence relative to the grating member. The grating member has a plurality of parallel opaque bars and adjacent transparent bars. The beam of light forms a multiple line shadow pattern on the surface below the grating member formed by the shadows of the opaque bars of the grating member. A camera records the multiple line shadow pattern, and the recorded pattern is superimposed on a plurality of parallel, equally spaced scan lines oriented perpendicular to the shadow lines. The distances between the points at which adjacent shadow lines cross each respective scan line are measured to determine the roughness or some other surface dimension.

30 Claims, 4 Drawing Sheets

APPARATUS AND METHOD FOR OPTICALLY MEASURING A SURFACE

FIELD OF THE INVENTION

The present invention relates to apparatus and methods for measuring and, more particularly, to apparatus and methods for optically measuring surfaces.

BACKGROUND INFORMATION

Components manufactured by many manufacturing processes, such as casting, extrusion, injection molding, vapor deposition, hot pressing, rolling, etc., rarely have the surface quality desired in the finished product, regardless of the method used to define surface roughness. For example, fabricated ceramic and powder metallurgy parts typically have an rms surface roughness in the range of submillimeters to tens of micrometers (microns) upon completion of the initial forming steps. Considerable time and energy is typically expended in performing rough and then fine grinding on the surfaces of such parts to produce the near-final shapes, and also to ensure a degree of surface roughness that is either sufficient for final use or sufficient as a starting point for ultra-fine grinding and polishing.

Because the final grinding and polishing steps are typically very expensive, a manufacturer is required to accurately determine when an optimum ground surface quality has been achieved, so that the expensive grinding operation can be terminated. However, with many known devices for measuring surface roughness, the part must be removed from the grinding and/or polishing jig and transported to a separate, often off-line test bed or chamber with a measuring device, in order to perform the surface characterization measurements. Accordingly, it has been particularly time consuming, and concomitantly expensive, to perform these surface measurements because the part must be frequently removed and evaluated several times before terminating the final grinding and polishing steps.

Typical apparatus for measuring surface roughness are stylus-type instruments, such as the device referred to as the Talysurf, which include a stylus or probe which is placed in contact with the surface to be measured and is moved along a linear dimension of the surface. The probe moves up and down with the contour of the surface, and thus provides an indication of the roughness of the surface. Because the stylus or probe must contact the surface in order to provide measurement of the surface roughness, however, the probe can scratch the surface, thus requiring further polishing and/or fine grinding which is an added expensive processing step. The test piece whose surface is to be measured also typically has to be removed from the grinding or polishing jig and then mounted on the measurement instrument to take the measurements. These types of instruments also typically require periodic calibration in order to account for the wear of the probe and to provide consistently accurate measurements. The measurements are also indicative of the roughness of only the specific points contacted by the stylus or probe in a linear dimension, thus often requiring a large number of measurements to accurately determine the surface roughness of an area of a surface.

Another method for measuring surface roughness is referred to as the Lichtschnitt method (from the German for "light-cut"). The Lichtschnitt method of surface topography measurement is well known in classical optical microscopy. An illuminated knife-edge is focused sharply on the target surface, at some oblique angle of incidence such as 45°. When viewed from above, the shadow edge will appear to be a rough (or tortuous) line separating light from shadow; the rougher the surface, the rougher this line. From geometry, measurements of the displacements of the shadow edge from a true straight line then give the heights of the peaks and valleys of the rough surface. This method, generally used in conjunction with microscope viewing of the target surface, has been used particularly to measure step-heights in the 0.5–50 micron step range. This method has generally not been used for the evaluation of rough surfaces, however, because of the tediousness of measurements and because of poor statistics resulting from the relatively short length of optical scan of the surface (as limited by the field of view of the microscope).

SUMMARY OF THE INVENTION

The present invention is directed to an apparatus for measuring the roughness of a surface, comprising a grating member which includes a plurality of parallel substantially opaque portions and adjacent substantially transparent portions. A light source of the apparatus transmits a beam of light through the grating member at an angle of incidence relative to the grating member. The beam of light thus forms a multiple line shadow (MLS) pattern on the surface below the grating member formed by the shadows of the opaque portions of the grating member. The apparatus further includes means for recording the multiple line shadow pattern for measuring the distances between the adjacent lines of the pattern and for determining the roughness of the surface based on these measured distances.

In one embodiment of the apparatus of the present invention, the means for recording includes an electronic camera for generating a plurality of parallel scan lines spaced apart from each other, and means for superimposing the recorded multiple line shadow pattern on the scan lines. The scan lines are oriented typically, but not necessarily, perpendicular to the shadow lines for measuring the distances between the points at which adjacent shadow lines cross each respective scan line.

An embodiment of the apparatus of the present invention further comprises a magnification unit located between the grating member and the means for recording the multiple line shadow pattern. At least one support member is also preferably coupled to the grating member. The support member contacts the surface to support the grating member spaced a substantially predetermined distance away from the surface. A collimating lens is also preferably located between the light source and the grating member for collimating the beam of light onto the grating member. A condensing unit is located between the light source and the collimating unit for condensing the beam of light prior to transmission through the collimating unit.

In an embodiment of the apparatus of the present invention, a computing unit is also coupled to the camera for receiving signals indicative of the recorded multiple line shadow pattern superimposed on the scan lines, and for determining and recording the distances between the points at which adjacent shadow lines cross each respective scan line. The computing unit determines the roughness of the surface based on the measured distances. The computing unit preferably computes an average value of the distances and the standard deviation of the distances from the average value, and computes the rms surface roughness based on the standard deviation divided by the average value. The computing unit also preferably computes the period of the grating member, which is based on the numbers of opaque and transparent portions per unit of width of the grating member, divided by a value based on the tangent of the angle of incidence of the beam of light. The computing unit then multiplies this quotient by the quotient of the standard deviation divided by the average value to compute the rms surface roughness.

The present invention is also directed to a method for measuring the roughness of a surface, comprising the following steps:

transmitting a beam of light through a grating member spaced a predetermined distance away from the surface, wherein the grating member includes a plurality of parallel substantially opaque portions and adjacent substantially transparent portions, and the angle of incidence of the beam of light relative to the grating member is selected to project a multiple line shadow pattern on the surface beneath the grating member formed by the shadows of the opaque portions of the grating member;

recording the multiple line shadow pattern; and measuring the distances between the adjacent lines of the multiple line shadow pattern and determining the roughness of the surface based on the measured distances.

An exemplary method of the present invention further comprises the steps of generating a plurality of parallel scan lines spaced apart from each other and superimposing the multiple line shadow pattern over the scan lines so that the scan lines are oriented typically, but not necessarily, perpendicular to the shadow lines. The distances between the points at which adjacent shadow lines cross each respective scan line are measured to determine the roughness of the surface based on the measured distances.

The exemplary method of the present invention preferably further comprises the steps of determining an average value of the distances and computing the standard deviation of the distances from the average value, determining a first quotient based on the standard deviation divided by the average value, and determining the surface roughness based on the first quotient. A second quotient is also preferably determined based on the period of the grating member divided by a value based on the tangent of the angle of incidence of the beam of light. The period of the grating member is based on the number of parallel opaque portions and adjacent transparent portions per unit of width of the grating member. The surface roughness is then determined by multiplying the first quotient by the second quotient.

One advantage of the apparatus and method of the present invention is that the apparatus can be packaged in a simple to use, on-line, moderate cost instrument, which allows in situ measurement of the rms surface roughness of precision components fabricated from ceramic, metallic, and composite materials at various stages in commercial forming and shaping processes. As a result, there is no need to remove the workpiece being tested from a processing jig during a roughness measurement, thus avoiding the cost, down-time, and mechanical remounting uncertainties associated with conventional test methods and devices.

Another advantage of the apparatus and method of the present invention is that because they use a multiple line shadow pattern as an optical method of surface-roughness measurement, the roughness data is simultaneously obtained over an extended area of view, as opposed to a point-by-point scan typically obtained with prior apparatus.

Another advantage of the method and apparatus of the present invention is that the rms surface roughness measurements obtained are absolute, i.e., the apparatus does not require calibration, as compared to prior stylus-type contact measurement instruments which typically require frequent calibration.

Yet another advantage of the method and apparatus of the present invention is that the surface being measured is touched only momentarily by, for example, contact pads, and the roughness determination itself is determined optically and, thus, non-destructively, as compared to prior stylus-type contact measurement instruments which can scratch the surface when performing a measurement. In the embodiment of the present invention employing contact pads, the pads do not contact the area of the surface being measured.

Also, because the method and apparatus of the present invention do not require a component to be physically dislodged from surface processing machinery, such as a grinding and/or polishing jig for measurement of the surface roughness, the target surface specification can easily be determined, and thus expensive grinding operations can be terminated without incurring unnecessary expenditure. Moreover, the cost of realigning a component after removing the component from a grinding and/or polishing jig for surface measurement is substantially avoided.

Other advantages of the apparatus and method of the present invention will become apparent in view of the following detailed description and accompanying drawings.

DETAILED DESCRIPTION

Figure 1:
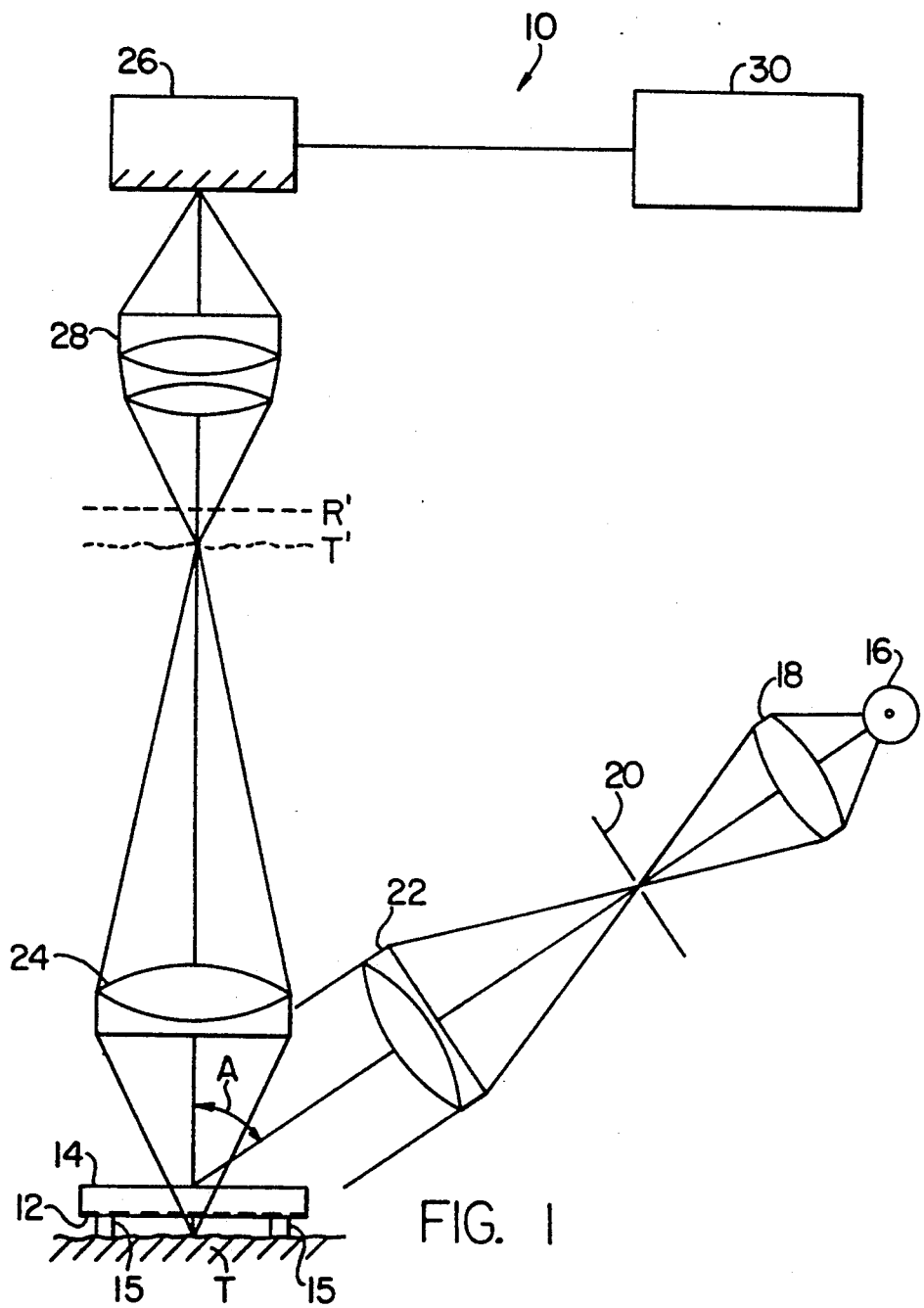
FIG. 1 is a schematic illustration of an apparatus embodying the present invention for measuring surface roughness.

In FIG. 1, reference numeral 10 denotes an apparatus embodying the present invention for measuring the rms surface roughness of a target surface "T". The target surface T is a typical surface which is relatively rough and diffusely reflecting. A grating or Ronchi ruling 12 including a glass backing 14 is supported by stiff contact pads 15 on the target surface T. The Ronchi ruling 12 is of a type known to those of ordinary skill in the art, and is essentially a grating made up of repetitive opaque and clear bars of equal width. As shown in FIG. 1, the contact pads 15 are dimensioned to support the Ronchi ruling 12 immediately above the target surface T, and are preferably made of a rubber-like soft material to avoid damaging the target surface T.

A light source 16 illuminates the target surface T through the Ronchi ruling 12 at an angle of incidence A with respect to a plane substantially normal to the target surface and Ronchi ruling, as shown in FIG. 1. In the embodiment of the present invention illustrated, the angle A is equal to approximately 45°. However, as will be recognized by those skilled in the art, the angle A is not limited to 45°. The light source 16 preferably illuminates the target surface T with white or narrow-band, noncoherent light which avoids the image granularity typically caused by laser speckle with laser light sources which are coherent. One type of light source that can be used is a tungsten-halogen lamp, such as the subminiature tungsten-halogen lamp model No. HPR50, manufactured by the OSRAM Corp. This light source is purely exemplary, however, and numerous other types of light sources can be used which are known to those skilled in the art.

A condenser 18 is supported between the light source 16 and a spectrometer slit 20. As shown in FIG. 1, the condenser 18 focuses the beam of light through the spectrometer slit 20 and into a collimator lens 22. The collimated beam of light from the lens 22 passes through the Ronchi ruling 12 and is incident onto the target surface T at the angle of incidence A. The condenser 18 is, in this embodiment, a 51 mm, f/1.3 achromat, and the collimator 22 is a 33 mm, f/5, spectrometer tube. These particular components are both purely exemplary, and numerous other types of condensers and collimators known to those skilled in the art can be equally used.

A magnifier 24 is supported directly above the Ronchi ruling 12 for magnifying the light reflected off the target surface T which passes through the Ronchi ruling 12, as shown in FIG. 1. The magnifier 24 is of a type known to those of ordinary skill in the art, such as a 50 mm, f/1.4 Nikkor (reversed). This type of magnifier is only exemplary, however, and numerous other types of means for magnification can be equally used which are known to those skilled in the art. A CCD camera 26 including a camera lens 28 is supported directly above the magnifier 24 and is adapted to record the image formed by the magnifier, as shown in FIG. 1. The CCD camera 26 and camera lens 28 illustrated are embodied in the camera module of the JVC model no. SC-F007U camcorder. This particular camera and lens are only exemplary, however, and numerous other types of cameras and lenses known to those skilled in the art can be equally used. The CCD camera 26 is coupled to a computer 30 for transmitting the recorded images to the computer, which in turn determines the rms surface roughness of the target surface T based on the recorded images, as is described further below.

In the operation of the apparatus 10, a beam of light is transmitted by the light source 16 through the condenser 18, which in turn condenses the beam through the spectrometer slit 20, as shown in FIG. 1. The beam of light is then transmitted through the collimator 22, which projects the collimated beam at the angle of incidence A through the Ronchi ruling 12 and onto the target surface T. The target surface T reflects the beam of light back through the Ronchi ruling 12 and into the magnifier 24. A primary magnified target surface image T' and a primary magnified Ronchi image R' are in turn transmitted onto the camera lens 28, as shown in FIG. 1, and recorded by the camera 26. The camera 26 transmits either one of the recorded images to the computer 30, which determines the rms surface roughness of the target surface T based on the recorded images, as is described further below.

Figure 2:
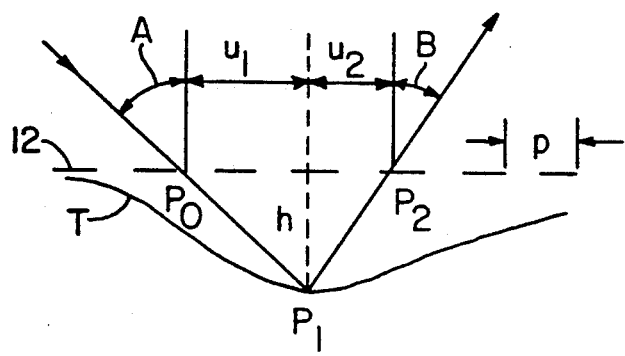
FIG. 2 is a schematic illustration of the physical optics employed by the apparatus and method of the present invention.

The physical optics employed in the operation of the apparatus and method of the present invention are hereinafter schematically described with reference to FIG. 2. FIG. 2 schematically illustrates a partial cross-section through a typical portion of the target surface T which, as can be seen, is a macroscopically non-flat surface. The Ronchi ruling 12, which is spaced immediately above the target surface T by the pads 15, as shown in FIG. 1, is defined by a period p. As shown in FIG. 2, the period p is based on the width of each opaque bar and adjacent clear bar.

FIG. 2 illustrates a single ray of the beam of light transmitted by the light source 16 through the Ronchi ruling 12 and onto target surface T at the angle of incidence A. As shown in FIG. 2, the ray intersects the Ronchi ruling 12 at a point $P_0$ and is reflected off the target surface T at a point $P_1$. The point $P_1$ is located a distance $h(x,y)$ below the plane of the Ronchi ruling 12. For purposes of illustration, the X axis lies in the plane of the paper of FIG. 2, and the Y axis is normal to the plane of the paper. Because the target surface T is not completely smooth, the distance $h(x,y)$ varies with both x and y. A ray diffusely reflected off the target surface T is transmitted back through the Ronchi ruling 12 at an angle of reflection B and intersects the Ronchi ruling at a point $P_2$, as shown in FIG. 2. Depending on whether the point $P_2$ is located either on a clear or an opaque bar of the Ronchi ruling 12, the ray is either transmitted onto the magnifier 24 (FIG. 1) or blocked, respectively.

The apparatus 10 thus effectively projects a shadow of the Ronchi ruling 12 onto the target surface T. This shadow, upon reflection into the selected viewing direction (toward the magnifier 24), projects the shadow pattern back onto the Ronchi ruling 12. The shadow pattern, however, is displaced by a distance $u(x) = u_1 + u_2$ in the x-direction, as shown in FIG. 2. This displacement is referred to as a phase modulation, thus defining a modulation function $M(x)$ as follows:

$$M(x) = u(x)/p \qquad (1)$$

wherein p is the period of the Ronchi ruling 12. Therefore, whenever the distance $h(x,y)$ is such that a clear bar of the Ronchi ruling 12 is projected onto another clear bar, i.e., whenever $M(x)$ is equal to an integer n (where $n = 0, 1, 2, 3 \ldots$), there is a maximum throughput of light to the magnifier 24. On the other hand, whenever $M(x)$ is equal to a half integer, i.e., when the clear bars are projected onto the opaque bars of the Ronchi ruling 12, the throughput of light is either at a minimum or equal to zero.

Thus, the projection of the beam of light by the apparatus 10 onto the target surface T produces a contour map of the target surface. A contour interval K of the contour map is defined by the following equation:

$$K = p/[\tan A + \tan B] \qquad (2)$$

Figure 3:
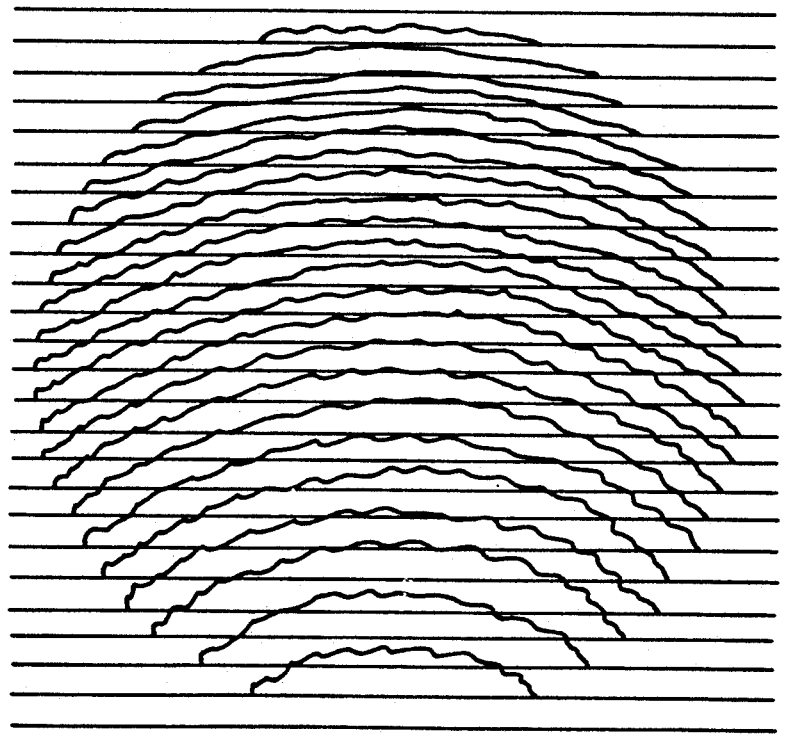
FIG. 3 is a schematic illustration of a computed moire fringe pattern of a typical flat target surface with a rough-surfaced, spherical protrusion.

FIG. 3 illustrates a computed moire fringe pattern of a typical flat target surface T (not shown) with a rough-surfaced, spherical protrusion or indentation of four periods p. As shown in FIG. 3, the reflected bars of the Ronchi ruling 12 are tortuous, thus indicating the roughness of the target surface T. The rougher the target surface T, the more tortuous is the path of each reflected bar of the Ronchi ruling 12. When this pattern is observed from a distance, the individual details of the distortions of each of the bars of the Ronchi ruling 12 can be suppressed, and the four concentric, circular moire fringes can be observed. With relatively rough surfaces, however, the circular moire fringes can lose visual contrast by being broken up into a random black/white, "salt-and-pepper" pattern.

Figure 4:
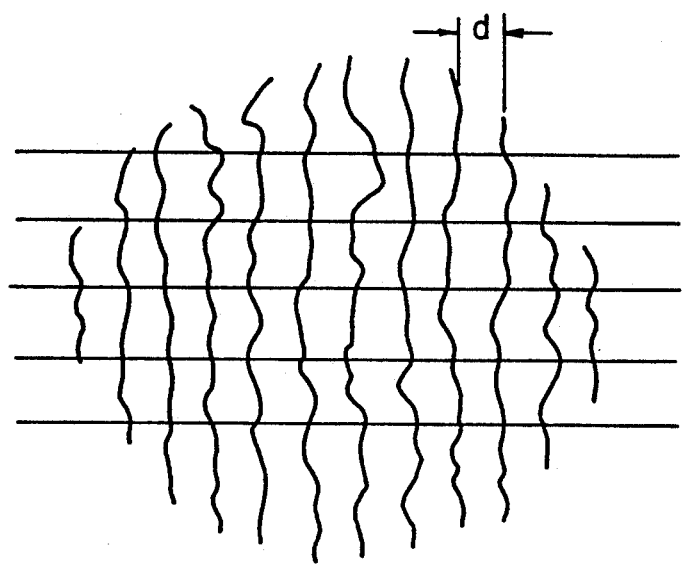
FIG. 4 is a schematic illustration of a typical multiple line shadow pattern of a rough surface that may be generated by the apparatus of FIG. 1.

However, the apparatus 10 overcomes this problem by generating a primary Ronchi image R' and a primary target surface image T', which are located in separate focal planes, thus non-overlapping, as shown in FIG. 1. Accordingly, the multiple line shadow (MLS) pattern (primary target surface image T') can be clearly distinguished from the Ronchi ruling pattern (primary Ronchi image R'). An illustration of a multiple line shadow pattern superimposed over horizontal scan lines of the CCD camera 26 that may be generated by the apparatus 10 is illustrated in FIG. 4 (i.e., without the Ronchi image pattern superimposed over the multiple line shadow pattern). Because the target surface T is rough, each line of the multiple line shadow pattern defines a tortuous path, as shown in FIG. 4. If, on the other hand, the target surface T were perfectly smooth, all of the shadow lines would be straight, vertical, and equally spaced relative to each other with the same period p as the overlying Ronchi ruling 12.

The apparatus 10 projects the multiple line shadow pattern (as shown in FIG. 4) onto the CCD camera 26 which has its scan lines oriented approximately in the horizontal direction, as shown in FIG. 4. FIG. 4 illustrates only several of the parallel scan lines, which are spaced far enough apart relative to each other so that the surface detail of the multiple line shadow pattern along any one scan line is substantially uncorrelated with the detail along any other.

Thus, based on the image of the multiple line shadow pattern generated by the CCD camera 26, the distances d between successive crossings of the line shadow centers along each scan line (shown typically in FIG. 4) can be measured, and the rms surface roughness R can be determined based on the following equation:

$$R = [p/(C \tan A)] \cdot [SD/X] \quad (3)$$

wherein X is the average distance between the line crossings d; SD is the standard deviation of all the distances d around the average X; A is the angle of incidence of the illuminating light beam; p is the period of the Ronchi ruling 12, typically measured in reciprocal lines per inch (1/lpi); and C is a numerical constant of proportionality which, in the simplest theory for vertical observation (angle B=0 in FIG. 2), is equal to $[2]^{\frac{1}{2}}$. As will be recognized by those skilled in the art, the accuracy of R is enhanced as the number of measured distances d is increased.

In one example, an apparatus embodying the present invention was used to measure the rms surface roughness of a target surface T, which was a plasma-sprayed coating on a nominally flat steel substrate (not shown). Referring to the apparatus of the present invention illustrated in FIG. 1, the Ronchi ruling 12 was spaced a fraction of a millimeter above the target surface T by the contact pads 15. The Ronchi ruling 12 defined a period p of 0.005 inch. The angle of incidence A of the beam generated by the light source 16 was 40°. Upon collimation through the collimating lens 22, the light beam, passing through the Ronchi ruling 12, formed a series of tortuous bright lines on the target surface T. The magnifier 24 was arranged to project the primary target surface image T', a distance equal to approximately two feet above the magnifier, and the image was, in turn, recorded by a camera.

The camera in the above example was not a CCD camera, but rather was a film camera located in the same position as the camera 26 in FIG. 1. Also, the camera was not coupled to a computer 30 as shown in FIG. 1, but rather provided a photographic image of the primary target surface image T'. The operator then drew the scan lines on the photographic image and physically measured the distances d and determined the rms surface roughness R as described below. As will be recognized by those skilled in the art, the present invention can be equally practiced in this manner without the CCD camera 26 and computer 30. These components simply provide a means for more rapidly making the measurements and obtaining the surface roughness data.

In the photographic image, the average (X) of the distances d between the dark tortuous lines of the primary target surface image T' was approximately 1.319 mm. Therefore, the five scan lines (illustrated typically in FIG. 4) were each spaced approximately three millimeters apart from each other to avoid a high degree of correlation from scan line to scan line. For each scan line, the position X at which the center of a tortuous line crossed the scan line was recorded to the nearest 0.05 mm by manual use of an overlay ruler. The recorded measurements of the crossings for the first scan line in this example are shown in the left-hand column in the table below (Crossing Distance), each measurement being taken from a base line at the beginning of the scan line.

| Data For The First Scan Line | | |
|---|---|---|
| Crossing Distance (mm) | d (mm) | d − X (mm) |
| 8.05 | | |
| 9.05 | 1.0 | −.3194 |
| 10.55 | 1.5 | .1806 |
| 11.85 | 1.3 | −.0194 |
| 13.5 | 1.65 | .3306 |
| 14.6 | 1.1 | −.2194 |
| 15.95 | 1.35 | .0306 |
| 17.05 | 1.1 | −.2194 |
| 18.35 | 1.3 | −.0194 |
| 19.65 | 1.3 | −.0194 |
| 20.9 | 1.25 | −.0694 |
| 22.45 | 1.55 | .2306 |
| 23.45 | 1.0 | −.3194 |
| 25.1 | 1.65 | .3306 |
| 26.1 | 1.0 | −.3194 |
| 27.55 | 1.45 | .1306 |
| 28.9 | 1.35 | .0306 |
| 30.55 | 1.65 | .3306 |
| 31.8 | 1.25 | −.0694 |

The center column in this table illustrates the corresponding distances d between the successive line-crossings, as shown typically in FIG. 4. The average distance X between line crossings of this one scan line is equal to the average value of the 18 distances d listed in the center column of the table, and is 1.3194 mm. The deviation (d-X) of each distance d from the mean value X is then illustrated in the right-hand column in the table. The sum of the squares of these deviations is equal to 0.8457, which is in turn divided by the number of deviations (18). The square root of this quantity is equal to the overall standard deviation (SD) of this scan line, which is 0.2168 mm.

Thus, for this single scan line, all of the parameters needed to obtain the rms surface roughness R in accordance with equation (3) are known:

$$p = 1/(200 \text{ lpi}) = 127 \text{ microns}$$
(Ronchi ruling: 200 lines per inch, lpi)
$$\tan A = \tan 40° = 0.8391$$
$$SD/X = 0.2168/1.3194 = 0.164$$
$$R = [127/(2)^{\frac{1}{2}} (0.8391)]* 0.164 = 17.6 \text{ microns}$$

where, the numerical constant of proportionality, $C=[2]^{\frac{1}{2}}$.

This same data reduction method was then applied to all five scan lines (as shown typically in FIG. 4) and the following table was obtained (wherein the values for the scan line 1 are as indicated above):

| Scan line | Number of deviations | X (mm) | SD (mm) | SD/X |
|---|---|---|---|---|
| 1 | 18 | 1.3194 | .2168 | .164 |
| 2 | 18 | 1.3194 | .2029 | .154 |
| 3 | 19 | 1.3132 | .1723 | .131 |
| 4 | 19 | 1.3316 | .2581 | .194 |
| 5 | 17 | 1.3088 | .1527 | .117 |
| All | 91 | 1.3187 | .2048 | .155 +/− .030 |

As indicated in the table, the overall standard deviation for the sample was 0.030, which was computed from the deviations of the five scan line values of SD/X from their mean value. The rms surface roughness was then calculated based on equation (3) as follows:

$$R = [127/\{(2)^{\frac{1}{2}} (0.8391)\}]*(0.155)$$

$$R = 16.6 +/− 3.2 \text{ microns}$$

Figure 5:
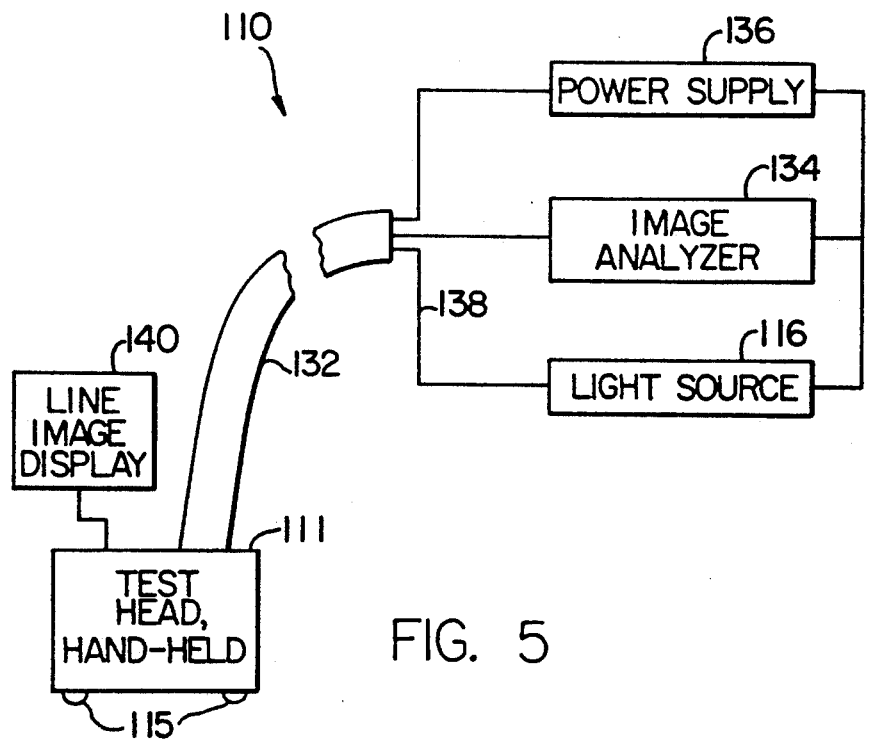
FIG. 5 is a schematic illustration of another embodiment of an apparatus of the present invention for measuring surface roughness.
Figure 6:
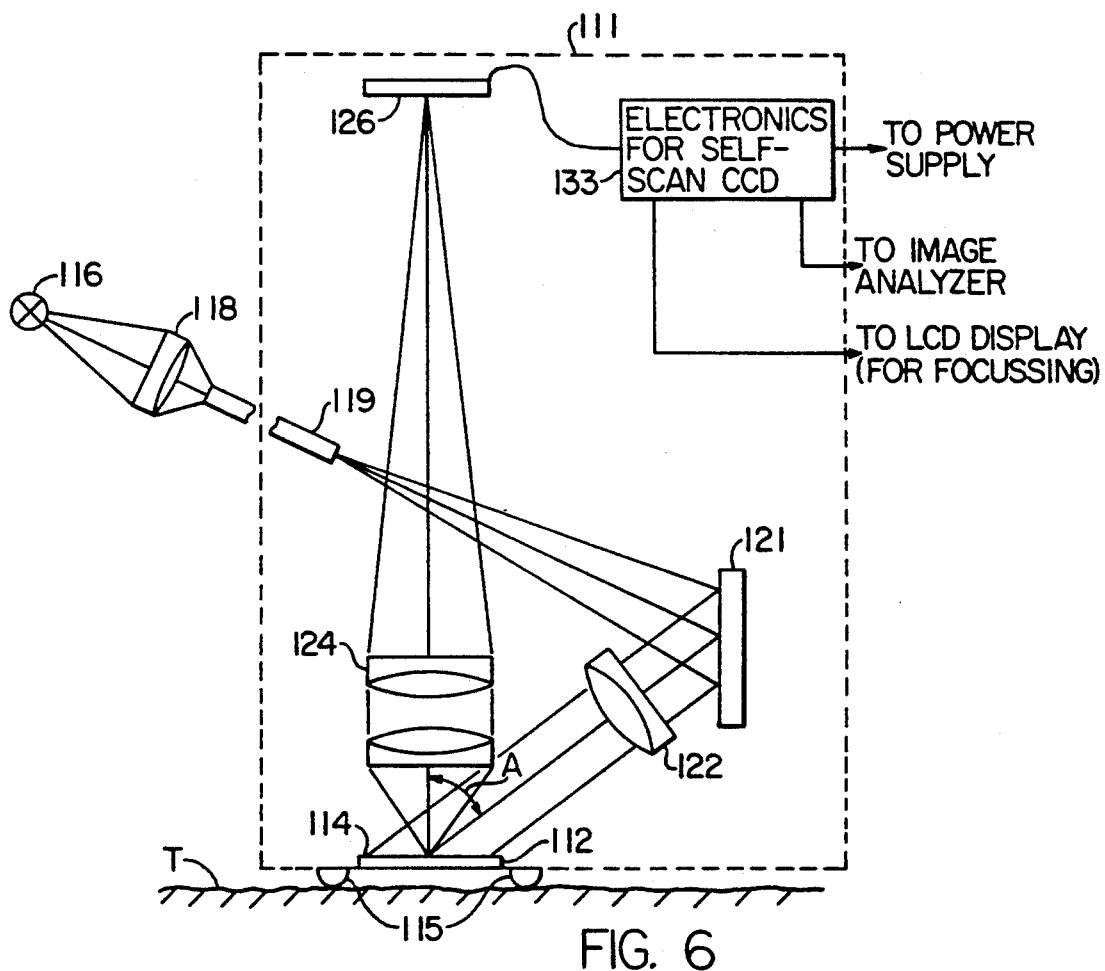
FIG. 6 is a schematic illustration of the hand-held, test head of the apparatus of FIG. 5.

In FIGS. 5 and 6, another apparatus embodying the present invention is indicated generally by the reference numeral 110. The apparatus 110 is substantially similar to the apparatus 10 described above in relation to FIGS. 1 through 4, and, therefore, like reference numerals preceded by the numeral 1 are used to indicate like elements.

The apparatus 110 comprises a hand-held, compact test head 111 coupled by means of an umbilical cord 132 to a light source 116, an image analyzer 134, and a power supply 136, as shown in FIG. 5. The light source 116 is coupled by an optical-fiber cable 138, which extends through the umbilical cord 132, to the test head 111, as is described further below. A line image display 140 is also coupled to the test head 111, and is preferably an LCD-type image display of a type known to those skilled in the art. As shown in FIG. 5, the power supply 136 is coupled to the image analyzer 134, the light source 116, and the test head 111 to power each of these components.

In FIG. 6, the test head 111 is shown in further detail, and comprises a Ronchi ruling 112, including a glass backing 114, which is essentially the same as the Ronchi ruling 12 and the glass backing 14 described above and shown in FIG. 1. Several contact pads 115 are coupled to the base of the test head 111 for supporting the test head 111 on a target surface T. The contact pads 115 are preferably adjustable in a manner known to those skilled in the art, in order to adjust the distance between the Ronchi ruling 112 and the target surface T.

As shown in FIG. 6, the light source 116 includes a condenser 118 which focuses the beam of light into the optical fiber cable 119. The optical fiber cable 119 transmits the beam of light through the umbilical cord 132 and into the test head 111, where the beam is incident onto a folding mirror 121 supported within the test head. The beam of light is reflected off the folding mirror 121 onto a collimator lens 122. The beam of light is then transmitted through the Ronchi ruling 112, at an angle of incidence A and onto the target surface T. The light reflected off the target surface T is then transmitted back through the Ronchi ruling 112 and onto a magnifier 124, which in the embodiment of the present invention illustrated is an adjustable, large-aperture, short focal length imaging lens of a type known to those skilled in the art.

The magnifier 124 transmits a primary magnified target surface image T' (not shown in FIG. 6) and a primary magnified Ronchi image R' (not shown in FIG. 6) toward a CCD camera 126. The primary magnified target surface image T' is a multiple line shadow (MLS) pattern formed by the shadows of the opaque bars of the grating 112. The camera 126 records the primary magnified target surface image T' and generates a plurality of parallel scan lines spaced apart from each other (as illustrated, for example, in FIG. 4) and superimposes the recorded primary magnified target surface image T' (or multiple line shadow pattern) over the parallel scan lines.

An electronic unit 133 is coupled to the camera 126 and generates output signals indicative of the recorded image superimposed on the scan lines in a manner known to those skilled in the art. The output signals of the electronic unit 133 are in turn transmitted to the line-image display 140 for displaying the recorded image superimposed on the scan lines on the LCD display. Upon viewing the display, the operator of the CCD camera 126 can then adjust the focus of the recorded image on the line image display. The electronic unit 133 also transmits its output signals to the image analyzer 134, which in turn calculates the distances d between the line crossings of the recorded image (as illustrated, for example, in FIG. 4), and then calculates the rms surface roughness R in accordance with equation (3) above.

As will be recognized by those skilled in the art, an advantage of the apparatus and method of the present invention is that the apparatus can be packaged in a hand-held instrument allowing in situ measurement of the rms surface roughness of a surface. Thus, the present invention is equally suitable for incorporation into either a portable or substantially stationary device. As a result, there is no need to remove the workpieces being tested from a processing jig as with prior methods and apparatus.

Another advantage of the apparatus and method of the present invention is that because a multiple line shadow (MLS) pattern is used as an optical method of surface roughness measurement, the roughness data are obtained over an extended area of view, thus requiring fewer measurements to determine the roughness of an area of a surface, in comparison to prior stylus-type devices which essentially measure surface roughness on a point-by-point basis as opposed to the whole area. Yet another advantage of the apparatus and method of the present invention is that because the rms surface roughness measurements are based on simple geometry, the apparatus does not require calibration as with prior stylus-type measuring devices. The measurements are absolute, and thus are not necessarily taken relative to a reference point, as with prior devices requiring calibration.

Another advantage of the apparatus of the present invention is that it can be adapted for use without any contact whatsoever with the workpiece or the surface being measured. For example, the apparatus may be supported on a robotic arm, and a proximity sensor may be used to appropriately locate the apparatus with respect to the test surface.

It should also be pointed out that the method and apparatus of the present invention are equally adaptable for measuring surface dimensions other than surface roughness. For example, the present invention may be employed to measure a step-height dimension of a surface, such as a coating thickness.

I claim:

1. An apparatus for measuring the roughness of a surface, comprising:
    a grating member including a plurality of parallel substantially opaque portions and adjacent substantially transparent portions;
    a light source for transmitting a beam of light through the grating member at an angle of incidence relative to the grating member, the beam of light forming a multiple line shadow pattern on the surface adjacent to the grating member comprising the shadows of the opaque portions of the grating member;
    means for separating an image of the grating member from an image of the multiple line shadow pattern; and
    means for recording the separated image of the multiple line shadow pattern exclusive of the image of the grating member for measuring a plurality of distances between the adjacent lines of the pattern and determining the roughness of the surface based on the measured distances.

2. An apparatus as defined in claim 1, wherein the means for recording includes a camera for recording the multiple line shadow pattern.

3. An apparatus as defined in claim 1, wherein the means for recording generates a plurality of scan lines spaced apart from each other and superimposes the recorded multiple line shadow pattern on the scan lines for measuring the distances between the points at which adjacent shadow lines cross each respective scan line to determine the roughness of the surface based on the measured distances.

4. An apparatus as defined in claim 3, further comprising a computing unit coupled to the means for recording for receiving signals indicative of the recorded multiple line shadow pattern superimposed on the scan lines and for determining the distances between the points at which adjacent shadow lines cross each respective scan line, and to determine the roughness of the surface based on the measured distances.

5. An apparatus as defined in claim 4, wherein the computing unit computes an average value of the distances and the standard deviation of the distances from the average value, and computes the rms surface roughness based on the standard deviation divided by the average value.

6. An apparatus as defined in claim 5, wherein the computing unit computes the rms surface roughness (R) by dividing the period (P) of the grating member, which is based on the width of an opaque and adjacent transparent portion of the grating member, by a value based on the tangent of the angle of incidence of the beam of light to obtain a first quotient, and multiplies the first quotient by a second quotient based on the standard deviation divided by the average value.

7. An apparatus as defined in claim 4, wherein the computing unit includes an image analyzer for determining the distances between the points at which adjacent shadow lines cross each respective scan line.

8. An apparatus as defined in claim 1, wherein the means for separating comprises a magnification unit located between the grating member and the means for recording the magnified multiple line shadow pattern.

9. An apparatus as defined in claim 1, further comprising at least one support member, coupled to the grating member for contacting the surface, to support the grating member spaced a substantially predetermined distance away from the surface.

10. An apparatus as defined in claim 1, further comprising a collimating unit located between the light source and the grating member for projecting the collimated beam of light onto the grating member and then onto the surface.

11. An apparatus as defined in claim 10, further comprising a condensing unit located between the light source and the collimating unit for condensing the beam of light prior to transmission through the collimating unit.

12. An apparatus as defined in claim 1, wherein the means for separating includes a lens.

13. A method for measuring the roughness of a surface, comprising the following steps:
    transmitting a beam of light through a grating member located adjacent to the surface, the grating member including a plurality of parallel substantially opaque portions and adjacent substantially transparent portions, the angle of incidence of the beam of light relative to the grating member being selected to project a multiple line shadow pattern on the surface adjacent to the grating member formed by the shadows of the opaque portions of the grating member;
    separating an image of the multiple line shadow pattern from an image of the grating member;
    recording the separated image of the multiple line shadow pattern exclusive of the image of the grating member; and
    measuring a plurality of distances between the adjacent lines of the multiple line shadow pattern and determining the roughness of the surface based on the measured distances.

14. A method as defined in claim 13, further comprising the steps of:
    forming a plurality of substantially parallel scan lines spaced apart from each other and superimposing the multiple line shadow pattern over the scan lines so that the scan lines are oriented approximately perpendicular to the shadow lines; and
    measuring the distances between the points at which adjacent shadow lines cross each respective scan line to determine the roughness of the surface based on the measured distances.

15. A method as defined in claim 13, further comprising the steps of determining an average value of the distances and the standard deviation of the distances from the average value, determining a first quotient based on the standard deviation divided by the average value, and determining the surface roughness based on the first quotient.

16. A method as defined in claim 15, further comprising the steps of determining a second quotient based on the period of the grating member divided by a value based on the tangent of the angle of incidence of the beam of light, wherein the period of the grating member is based on the number of parallel opaque portions and adjacent transparent portions per unit of width of the grating member, and determining the surface roughness by multiplying the first quotient by the second quotient.

17. A method as defined in claim 13, further comprising the steps of magnifying the separate image of the multiple line shadow pattern and recording the magnified multiple line shadow pattern.

18. A method as defined in claim 13, further comprising the steps of collimating the beam of light and transmitting the beam of light through the grating member.

19. An apparatus for measuring at least one surface dimension, comprising:
 a grating including a plurality of substantially opaque portions and adjacent substantially transparent portions;
 a light source for transmitting a beam of light through the grating at an angle of incidence relative to the grating for forming a multiple line shadow pattern on the surface formed by the shadows of the opaque portions of the grating;
 a lens for separating an image of the multiple line shadow pattern from an image of the grating; and
 a recording unit for recording the separated image of the multiple line shadow pattern exclusive of the image of the grating for measuring a plurality of distances between the adjacent lines of the pattern and determining at least one dimension of the surface based on the measured distances.

20. An apparatus as defined in claim 19, wherein the recording unit includes a photographic camera for photographing the multiple line shadow pattern.

21. An apparatus as defined in claim 19, wherein the recording unit electronically records the multiple line shadow pattern, and electronically generates a plurality of scan lines spaced apart from each other and superimposes the recorded multiple line shadow pattern on the scan lines for measuring the distances between the points at which adjacent shadow lines cross each respective scan line to determine the at least one dimension of the surface based on the measured distances.

22. An apparatus as defined in claim 21, further comprising a computing unit coupled to the recording unit for receiving signals indicative of the recorded multiple line shadow pattern superimposed on the scan lines and for determining the distances between the points at which adjacent shadow lines cross each respective scan line, and to determine the at least one dimension of the surface based on the measured distances.

23. An apparatus as defined in claim 19, further comprising a magnification unit including the lens for magnifying the separated image of the multiple line shadow pattern prior to recording by the recording unit.

24. An apparatus as defined in claim 19, further comprising a collimating unit for collimating the beam of light onto the grating.

25. An apparatus as defined in claim 24, further comprising a condensing unit for condensing the beam of light prior to transmission through the collimating unit.

26. An apparatus as defined in claim 19 enclosed within a portable housing for in situ measurement of a surface.

27. An apparatus as defined in claim 19, wherein the measurement of the surface is absolute.

28. An apparatus as defined in claim 19, wherein the at least one dimension is the roughness of the surface.

29. An apparatus for measuring at least one surface dimension, comprising:
 a grating including a plurality of substantially opaque portions and substantially transparent portions between substantially opaque portions;
 means for transmitting light through the grating and forming a multiple line shadow pattern on the surface adjacent to the grating comprising the shadows of the opaque portions of the grating;
 means for transmitting an image of the multiple line shadow pattern into a focal plane separate from a focal plane of an image of the grating; and
 means for recording the image of the multiple line shadow pattern exclusive of the image of the grating to measure a plurality of distances between the adjacent lines of the pattern and determine at least one dimension of the surface based on the measured distance.

30. An apparatus as defined in claim 29, further comprising means for generating a plurality of scan lines spaced apart from each other and superimposed over the recorded image of the multiple line shadow pattern, and means for measuring the distances between points at which adjacent shadow lines cross scan lines to determine the at least one dimension of the surface based on the measured distances.

* * * * *